J. P. HOLDEN.
VULCANIZING TOOL.
APPLICATION FILED NOV. 7, 1921.

1,413,533.

Patented Apr. 18, 1922.

J. P. Holden
INVENTOR.

BY
Egerton R. Case
ATTORNEY.

UNITED STATES PATENT OFFICE.

JOHN P. HOLDEN, OF TORONTO, ONTARIO, CANADA, ASSIGNOR TO RELIANCE CURING CORE LIMITED, OF TORONTO, ONTARIO, CANADA, A CORPORATION OF ONTARIO.

VULCANIZING TOOL.

1,413,533.     Specification of Letters Patent.    Patented Apr. 18, 1922.

Application filed November 7, 1921. Serial No. 513,223.

*To all whom it may concern:*

Be it known that I, JOHN P. HOLDEN, a citizen of the United States, residing in the city of Toronto, county of York, Province of Ontario, Canada, have invented certain new and useful Improvements in Vulcanizing Tools, of which the following is a specification.

My invention relates to improvements in vulcanizing tools, and one object of my invention is to provide an expander for use therewith which can be used particularly in connection with the vulcanization of the casing or carcass of pneumatic tires, irrespective of the diameter of said carcass or casing, thereby absolutely insuring that the proper pressure be exerted against the work in the vulcanizing tool at all points in order to insure the thorough mending or repair of said tire or casing. Another object of the invention is to provide the expander with a protector or shielding which while preferably positively assisting the elongation of the expander in order to insure the uniform radial contraction thereof, will at the same time prevent the tensioning device cutting through the expander. A still further object of my invention is to simplify the construction of the tensioning device and reduce weight thereof.

A disclosure within my invention comprises an expander made of suitable elastic material, such as rubber, or rubber-compound, provided with a longitudinal bore. Mounted in said bore is a preferably elastic protector or shielding adapted to be compressed as the expander is compressed. This protector or shielding is preferably in the form of a spiral spring. Means is associated with each end of the expander, and coupled to the means at one end of said expander and passing through said protector or shielding is a flexible coupling element, which is associated with the means at the other end of said expander in such manner as to permit pressure to be exerted longitudinal of the expander to radially expand the same substantially equally at all points, irrespective of the size of the arc occupied by the expander. Means is associated with the outer end of said coupling element to control the tension thereon, as hereinafter more particularly explained.

In the drawings, like characters of reference refer to the same parts.

Figure 1:
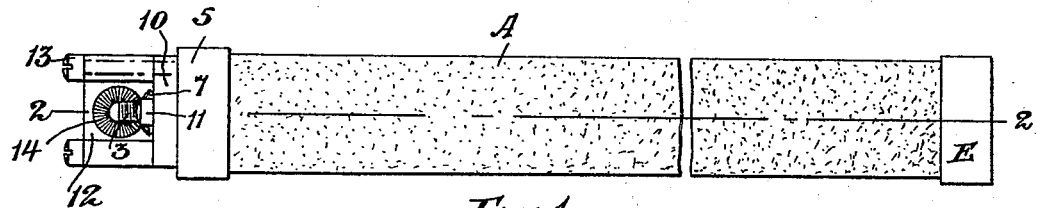
Fig. 1 is a side elevation of my preferred form of expander, broken into two portions.
Figure 2:
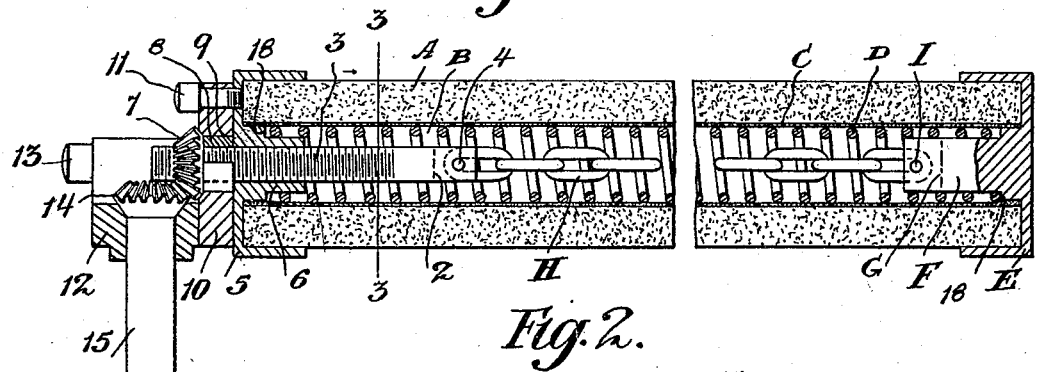
Fig. 2 is a vertical longitudinal section, on an enlarged scale, on the line 2—2, Fig. 1.

It is well-known that the cross sectional area, and the diameter, of the carcass or casing of pneumatic tires, varies, and an expander to be used with a vulcanizing tool must be flexible so that it may be efficient in pressing all necessary parts of a carcass or casing of a given cross sectional area in contact with the vulcanizing tool to effect a thorough repair, irrespective of the diameter of the carcass or casing, in other words, irrespective of the size of the arc the expander will be given by the vulcanizing tool or core. Obviously the smaller the arc the expander is ultimately shaped to, the greater the flexing, that is to say, the greater the bending movement of the expander will be to one side of the longitudinal axis of the expander when not bent. At the highest and lowest points of the bend or arc it has heretofore been found impossible to get proper expansion of the expander to force the carcass or casing in contact with the vulcanizing tool at these points, and the result is that a repair cannot be properly effected. I overcome this defect, as will hereinafter appear.

A is the expander made of any suitable elastic material, such as rubber or rubber-compound, and of course the normal diameter and length thereof will be made according to the size of the vulcanizing tool or core the same is to be used with. The expander A is provided with a longitudinal central bore B, the walls of which may be lined by canvas C, if desired. Mounted within the said bore and preferably to snugly fit the same, is an elastic protector or shielding preferably in the form of a spiral spring D, the coils of which are sufficiently close together to effect the object in view. Positioned at one end of the expander A is a compressing member E preferably in the form of a flanged cap which receives one end of the expander A. This compressing member is centrally provided at its inner side with a stud F slotted as shown by dotted line G at one end to receive one end of the coupling element H, which in the disclosure made is in the form of a chain. I is a pin passing through the slotted end of the stud F to retain one end of the chain in place. The other end of this coupling element or chain is mounted within a slot 2 formed in the inner end of the threaded bar 3, and a pin 4 is carried by this bar to couple the other end of the coupling element or chain H thereto. The coupling element H, as well as the threaded bar 3, form what I term the flexible member of the tensioning device. 5 is a compressing member preferably in the form of a flanged cap which houses the opposite end of the expander A, and this compressing member is centrally provided with an unthreaded hub 6, on the inner side thereof, through which passes the threaded bar 3. 7 is a bevelled pinion provided with an exteriorly unthreaded hub 8 which is mounted in a hole 9 formed in the plate 10. There is an internally-threaded bore formed through the pinion 7 and its hub 8 so that the bar 3 may operate therethrough. The plate 10 is coupled to the member 5 after any suitable manner, as by means of a cap bolt 11. 12 is a bracket coupled by the cap bolts 13 to the plate 10. Journalled in the bracket 12 is a bevelled pinion 14 which meshes with the pinion 7. The shaft 15 of this pinion is adapted to be operated by any suitable tool to operate the gearing.

It will be understood that in order to compress the expander A, the flexible member of the tensioning device must be caused to exert pressure against the members 5 and E, and this can be conveniently done by means of the bevelled gears, or their equivalent, before-mentioned.

As the expander A is shortened, it necessarily expands radially, and by reason of the flexible member of the tensioning device, the radial expansion of the expander A, will be substantially uniform irrespective of the arc the expander may ultimately occupy.

The elastic protector or shielding D will absorb energy as the expander A is being shortened, and consequently this stored energy will be automatically available to assist in the decrease in the transverse diameter of the expander A after use.

The elastic protector or shielding D will not interfere with the flexibility of the flexible member of the tensioning device, and an additional function performed by this protector or shielding is that of a shield for the bore B to prevent the flexible member of the tensioning device cutting into the expander A, and consequently lengthen the life of the tool.

The device is relatively cheaply manufactured, and can be readily taken apart for repairing.

Figure 3:
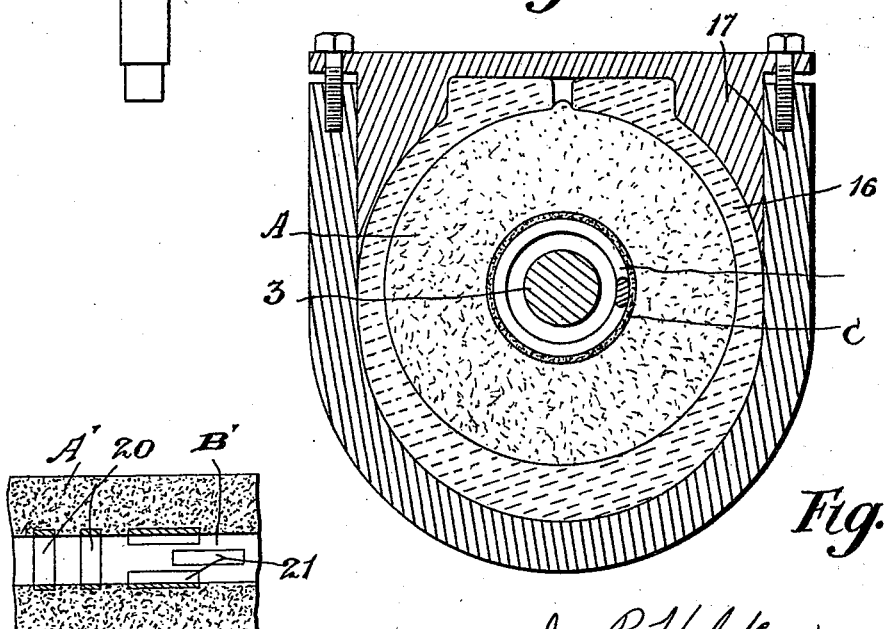
Fig. 3 is a vertical cross-section on the line 3—3, Fig. 2, on an enlarged scale, showing the expander mounted for use in a vulcanizing tool, which is shown in cross-section.

In Fig. 3 I show my device mounted within the carcass or casing 16, which is shown as positioned within the usual vulcanizing tool or core 17.

Figure 4:
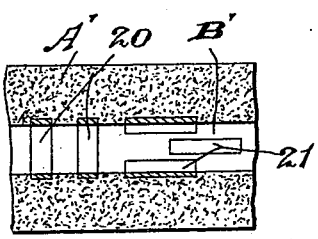
Fig. 4 is a central longitudinal section through the expander showing an alternative form of protector or shielding.

In Fig. 4 I show the bore B′ of the expander A′ as provided with an alternative form of protector or shielding to prevent the flexible member (not shown in this view), cutting into the expander. This form of protector or shielding is composed of a plurality of separated rings 20 or plates 21 moulded in with the expander in such location as to function as desired. This form of protector or shielding of course will not absorb energy during the compression of the expander as is the case with the elastic protector or shielding D.

Any elastic protector or shielding having the mode of operation of the spiral spring D may of course be used. The greater the angle that the coils of the spring D occupy to the longitudinal axis of the spring, it will be understood that as the expander A is compressed the greater will be the tendency for the coils of the spring to move into a lesser angle to the said longitudinal axis, thereby increasing the diameter of the elastic protector or shielding D, and therefore the expanding movement of the expander A will be appreciably assisted thereby.

To get the best result, the hub 6 and the stud F should enter the protector or shielding D, which should contact with the annular flanges 18 forming part of the said hub and stud.

While I have described what I consider to be the best embodiment within my invention, it must be understood that I do not confine myself to the construction herein shown and described except in so far as that may be necessary by reason of the prior art and the terms of my claims.

What I claim is:

1. In combination an elastic expander provided with a longitudinal bore, and a tensioning device including a link-like member mounted within said bore which link-like member is relatively of considerable less diameter than the said bore, said tensioning device adapted to longitudinally compress said expander and without interfering with the arc assumed thereby, for the purpose specified.

2. In combination an elastic expander provided with a longitudinal armoured bore, and a tensioning device including a link-like member mounted within said bore which link-like member is relatively of considerable less diameter than the said bore, said tensioning device adapted to longitudinally compress said expander and without interfering with the arc assumed thereby, for the purpose specified.

3. In combination an elastic expander provided with a longitudinal bore; an elastic protector or shielding for said bore, and flexible means passing through said protector or shielding and adapted to be put under tension or strain to compress said expander and shielding for the purpose of substantially uniformly radially expanding said expander.

4. In combination an elastic expander provided with a longitudinal bore; a flexible compression member within said bore and adapted to be associated with each end of said expander, and means movably associated with one end of said compressing member, for the purpose specified.

5. In combination an elastic expander provided with a longitudinal armored bore; a compressing member associated with one end of said expander; a compressing member associated with the other end of said expander and provided with a plain aperture therethrough; a plate coupled to said second-mentioned compressing member and provided with an aperture therethrough opening into the aperture through said second-mentioned compressing member; a hub-provided bevelled pinion mounted in the aperture in said plate, and provided with an internally-threaded bore; a threaded bar upon which said pinion is mounted, which bar extends through said plate and second-mentioned compressing member; a flexible coupling element attached to one end of said threaded bar, and attached to said first-mentioned compressing member and located within said armored bore, and a bevelled pinion in mesh with the other bevelled pinion and adapted to be permanently supported in relation thereto, for the purpose specified.

6. In combination an elastic expander provided with a longitudinal bore; a spiral spring mounted within said bore and substantially co-extensive therewith; a compressing member associated with one end of said expander and centrally provided with a stud on its inner side which extends into said spring; a centrally bored compressing member associated with the other end of said expander and provided with a hub which extends into the other end of said spring; a threaded bar extending through said hub-provided compressing member into said spring; a flexible coupling element positioned within said spring and coupled at one end to the inner end of said threaded bar, and coupled at the other end to the stud of said first-mentioned compressing member, and means co-acting with said threaded bar and coupling element to control the strain thereon.

7. In combination an elastic expander provided with a longitudinal bore; an elastic spiral shielding or armour mounted within said bore, and means whereby said expander and shielding are longitudinally compressed so as to substantially uniformly radially expand said expander to uniformly increase the diameter thereof.

8. As a new article of manufacture, an elastic expander provided with a longitudinal elastic metallic core adapted when said expander is longitudinally compressed, to substantially uniformly radially expand and expand said expander to substantially uniformly increase the diameter thereof.

9. In combination an elastic expander provided with a longitudinal bore, and a tensioning device mounted in said bore and of less diameter thereof, and including a bar adapted to be adjustably associated with one end of said expander, and a chain attached to the inner end of said bar and adapted to be associated with the other end of said expander, for the purpose set forth.

10. In combination an elastic expander, and a tensioning device mounted centrally longitudinally therein, and adapted to longitudinally compress said expander and to transversely flex to any degree in order not to interfere with the arc assumed by said expander.

11. In combination an elastic core adapted to be expanded when shortened longitudinally by compression, and an elastic covering for said core which partakes substantially of the change in form or shape of the said core, for the purpose specified.

JOHN P. HOLDEN.